Figure 1:
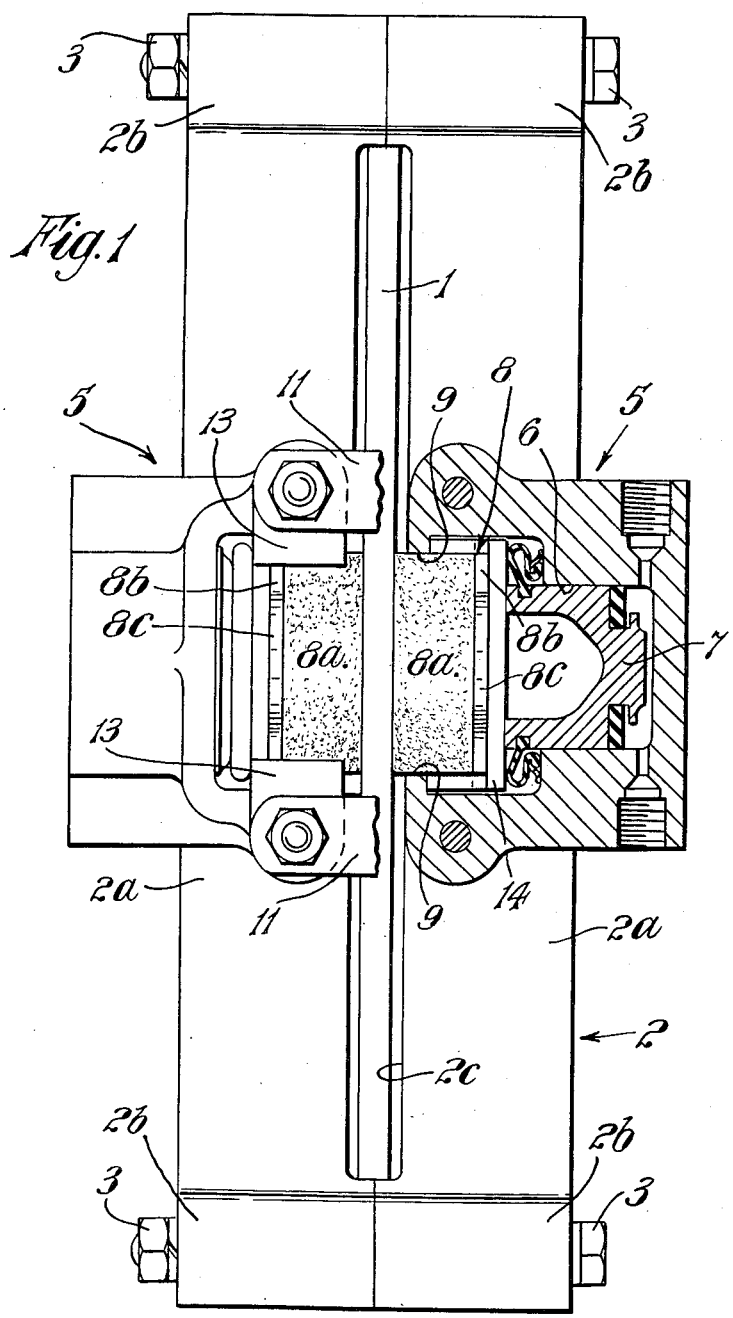

May 14, 1963 H. J. BUTLER 3,089,565
DISC BRAKES
Filed May 25, 1960 5 Sheets-Sheet 1

INVENTOR
Henry James Butler
by Benj. T. Rauber
his attorney

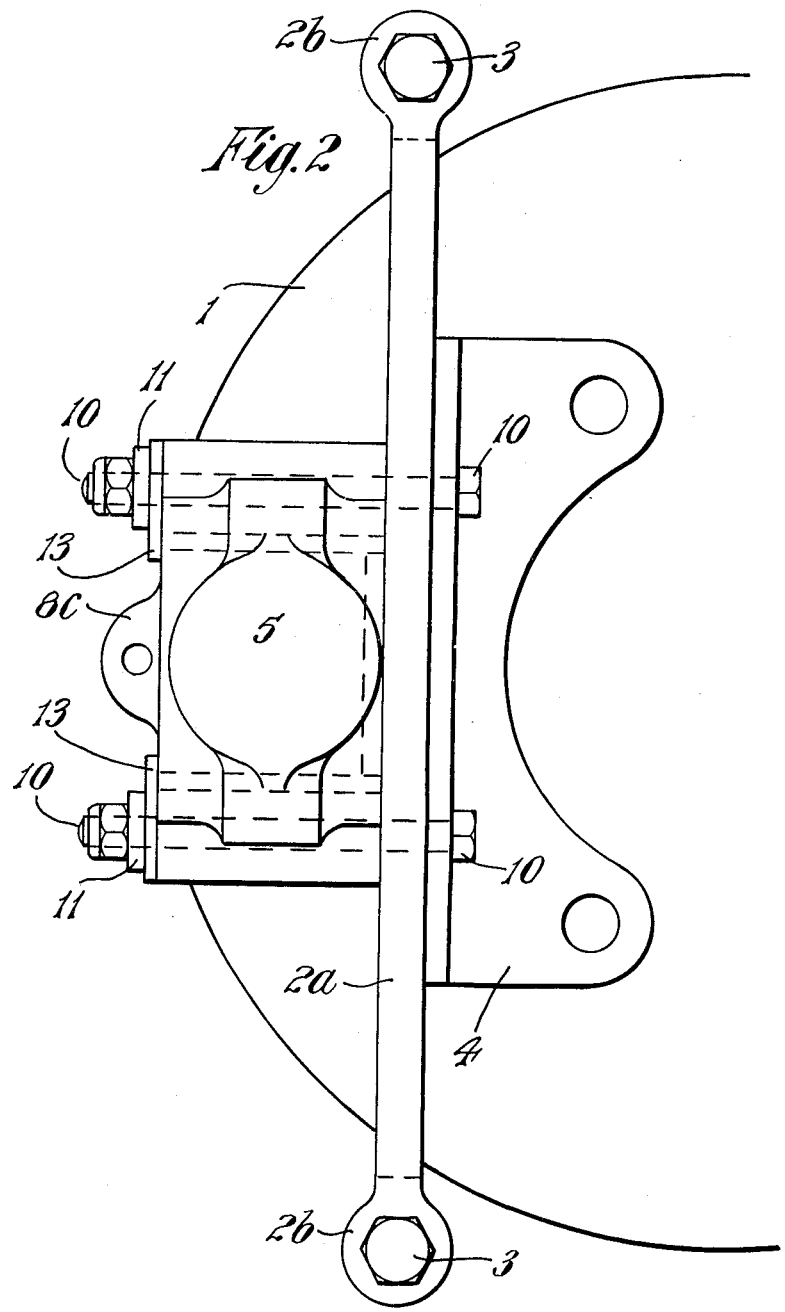

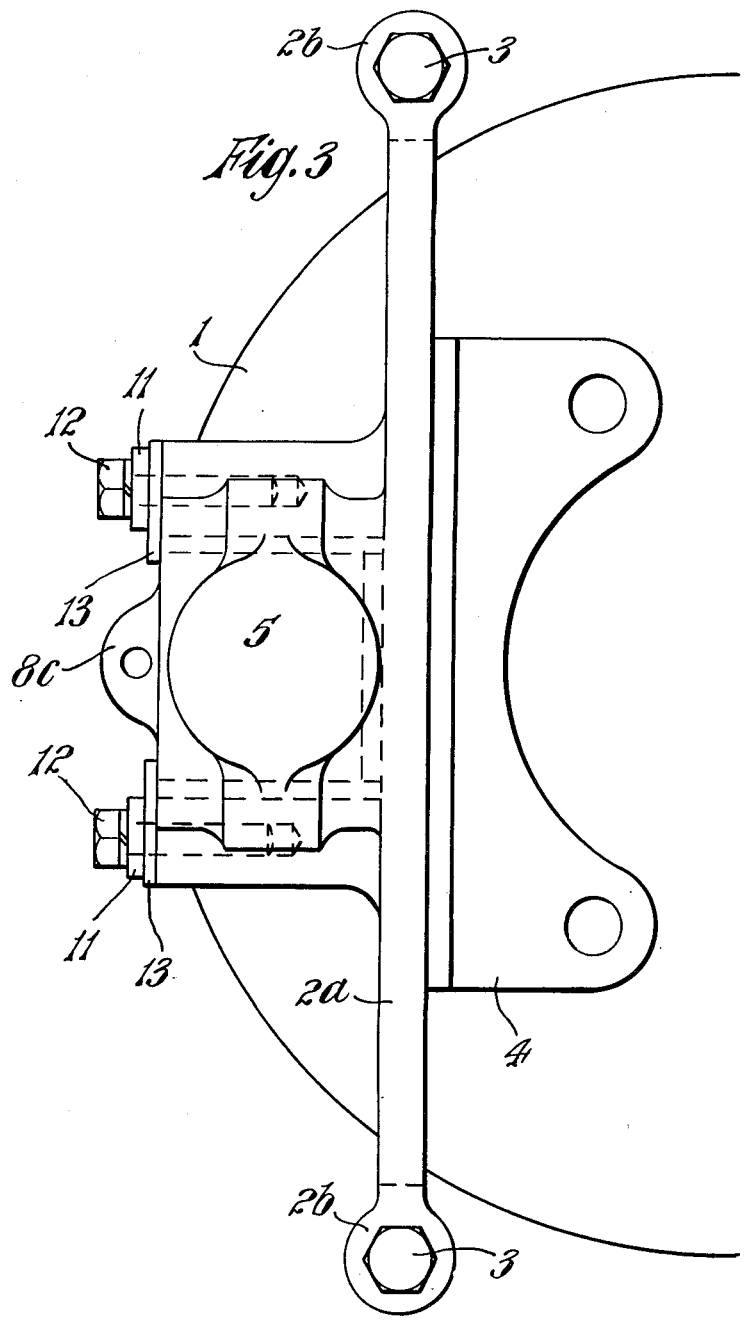

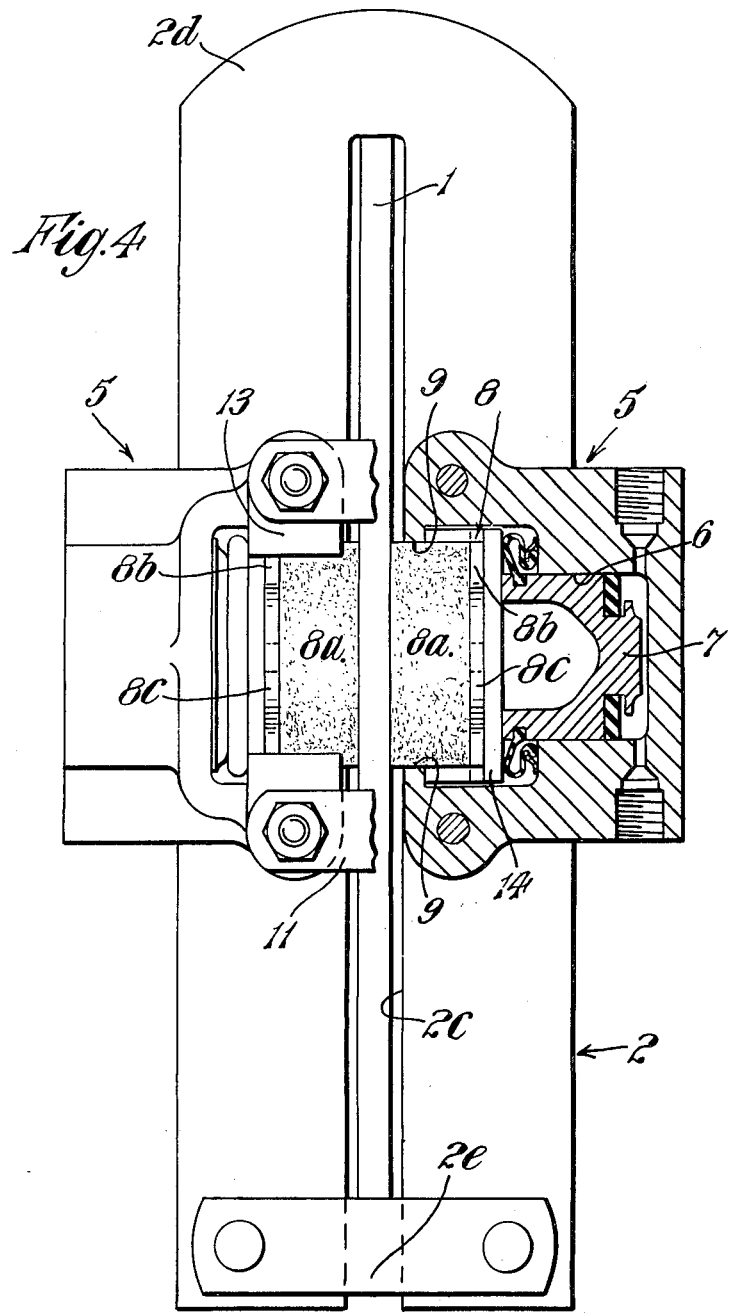

May 14, 1963  H. J. BUTLER  3,089,565
DISC BRAKES
Filed May 25, 1960  5 Sheets-Sheet 5
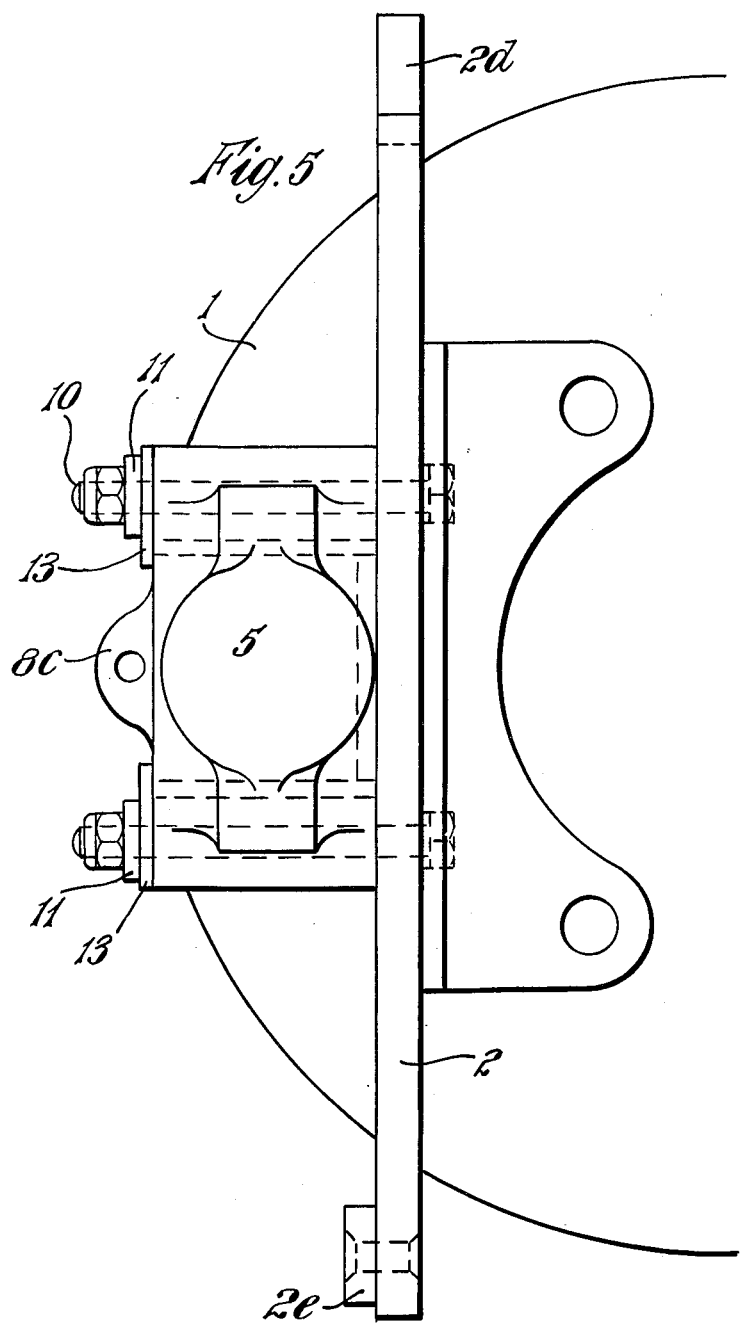
INVENTOR
Henry James Butler
by Benj. T. Rauber
his attorney

United States Patent Office 3,089,565
Patented May 14, 1963

3,089,565
DISC BRAKES
Henry James Butler, Sutton Coldfield, England, assignor to Dunlop Rubber Company Limited, London County, England, a British company
Filed May 25, 1960, Ser. No. 31,616
6 Claims. (Cl. 188—73)

In my co-pending application Serial No. 724,562, filed March 28, 1958 now Patent No. 3,005,522, granted October 24, 1961, I have described a disc brake comprising a rotatable disc, a rigid, non-rotatable slotted base member completely encircling the disc on a chord thereof with the edges of the slot close to the surfaces of the disc, friction pads associated with the base member and located on opposite sides of the slot therein and mechanism for effecting braking engagement between the friction pads and the disc.

The present invention provides a modified form of the disc brake described in said application in which the slotted base plate, instead of being of integral construction and formed of a single piece of material, is formed of at least two members rigidly secured together, e.g., by nuts and bolts or by welding.

Thus the base plate may be constituted by two members located side by side and defining opposite sides of the slot, said members being rigidly connected together at their opposite ends. Alternatively it may be formed of a member of horse-shoe form, the limbs of which define the slot, and a bridge-piece rigidly connected to the free ends of the limbs of the horse-shoe.

Certain embodiments of the invention will now be described in more detail, by way of example, with reference to the accompanying drawings in which:

FIGURE 1 is a plan view, partly in section, showing one form of brake constructed in accordance with the invention, FIGURE 2 is a corresponding side elevation, FIGURE 3 is a side elevation of a similar brake to that of FIGURE 1, FIGURE 4 is a plan view, partly in section, of another form of brake constructed in accordance with the invention, and FIGURE 5 is a corresponding side elevation.

In the disc brakes shown in FIGURES 1, 2 and 3 a rotatable braking disc is shown at 1 and a base plate 2 completely encircles the disc on a chord thereof. The base plate 2 is constituted by a pair of substantially rectangular members 2a, each of which has its ends formed as hollow bosses 2b. The members 2a are held rigidly together by nut and bolt assemblies 3, the bolts of which extend through the bosses 2b. The two members 2a together form a rectangular base plate 2 longitudinally slotted between the bosses 2b, the width of the slot 2c so formed being slightly greater than the thickness of the disc 1. A fixing bracket 4 bolted (FIGURE 2), welded (FIGURE 3), or otherwise secured to one of the members 2a serves for attachment of the base plate 2 to a non-rotatable member.

On the side of the base plate remote from the flange 4 are mounted a pair of opposed housings 5, situated on opposite sides of the disc 1 and each containing a fluid pressure actuator and a friction pad assembly. The fluid pressure actuator of each housing 5 is constituted by a cylinder 6 bored in the housing 5 and a co-operating piston 7. The piston 7 bears on a friction pad assembly which consists of a friction pad 8a bonded to a backing plate 8b. The friction pad assembly is guided for axial movement towards and away from the disc 1 by guides 9 in the housing 5. Each housing 5 may be formed integral with its associated half 2a of the base plate (as shown in FIGURE 3) or it may be formed separately with holes drilled to receive bolts 10 (FIGURES 1 and 2) by which it is rigidly secured to the member 2a.

The top of each housing, i.e., that part which is radially outermost from the centre of the disc, is partly cut away to allow the friction pad assembly to be entered between the guides 9. The housings 5 are detachably connected together by a pair of straps 11, adjacent the outer periphery of the disc, which are secured by the housing retaining bolts 10, in the construction shown in FIGURES 1 and 2 or by set bolts 12 in the construction shown in FIGURE 3. The straps 11 and bolts 10 or 12 serve also to locate pad retaining plates 13 and when the bolts 10 or 12 are slackened these can be swung aside from the position in which they retain the friction pad assemblies to enable these to be withdrawn. A projecting tongue 8c on the backing plate 8b serves for easy withdrawal of the friction pad assembly 8.

Pad wear compensating devices 14 and retracting mechanisms of known kind may be fitted.

In the disc brake shown in FIGURES 4 and 5 the base plate is made in a single piece of horse-shoe form with the longitudinal slot 2c defined between the limbs of the horse-shoe. The two limbs which are situated on opposite sides of the disc are connected by an integral portion 2d. The free ends of the limbs are rigidly connected by a bridge piece 2e riveted or otherwise secured to them. The other parts of the brake of FIGURES 4 and 5 are as described for the brake of FIGURES 1 and 2 or 3.

The advantages of the constructions of brake described above are their simplicity and the economy with which they can be manufactured.

Having now described my invention, what I claim is:

1. A disc brake comprising a rotatable disc, a non-rotatable structure comprising a pair of base members positioned on opposite sides of said disc in a common plane chordwise of said disc, individual connector means rigidly securing said base members together at their ends beyond the periphery of said disc, a side support rigidly mounted on each of said base supports and extending over and beyond the segment of said disc radially outwardly of said base members, means joining said side supports beyond the periphery of said disc, each said side support having a cylindrical recess formed therein co-axially with the cylindrical recess of the opposite side member, a piston slidable in each said recess toward and from said disc and a friction element between each said piston and said disc to be moved under pressure by said piston into frictional contact with the radial surface of said disc.

2. A disc brake comprising a rotatable disc, a non-rotatable structure comprising on each radial side of said disc a base element extending in a common plane with the base element on the other side of said disc chordwise of said disc and beyond the periphery of said disc and being connected to each other beyond said periphery and a pair of side supporting elements one on each side of said disc mounted respectively on one of said base elements and extending radially outwardly from said base elements alongside a portion of the segment of said disc subtended by the chordwise plane of said base elements to a distance beyond the periphery of said disc, each side supporting element having a pair of guide surfaces normal to the braking surfaces of said disc and spaced to receive a friction element and to guide and support the friction element in movement toward and from the braking surfaces of said disc and opening radially outwardly, said side supporting elements each comprising a cylinder and piston to force a friction element in the space between said guide surfaces into engagement with said disc, means connecting said side supporting elements beyond the periphery of said disc and releasable retaining elements on said supporting elements to retain friction elements from radially outward movement.

3. The disc brake of claim 2 in which said side supporting elements are united integrally with said base elements.

4. The disc brake of claim 2 in which said side supporting elements are secured to said base elements by bolts.

5. The disc brake of claim 2 in which the means to connect together the outer portions of said side supporting elements comprises a pair of links bolted to said supporting elements and spaced circumferentially of said disc a distance not less than the width of said space between said guide surfaces to permit the withdrawal of friction elements.

6. The disc brake of claim 5 having displaceable retaining members to hold the friction elements from radially outward movement.

References Cited in the file of this patent

UNITED STATES PATENTS

| | | |
|---|---|---|
| 2,375,152 | Turner | May 1, 1945 |
| 2,894,607 | Butler | July 14, 1959 |
| 2,915,147 | Davis | Dec. 1, 1959 |
| 2,921,650 | Butler | Jan. 19, 1960 |
| 2,968,370 | Ruet | Jan. 17, 1961 |

FOREIGN PATENTS

| | | |
|---|---|---|
| 1,205,317 | France | Aug. 17, 1959 |